US012065155B2

(12) United States Patent
Tiwari (10) Patent No.: US 12,065,155 B2
(45) Date of Patent: Aug. 20, 2024

(54) VEHICLE CONTROL SYSTEM AND METHOD

(71) Applicant: Gatik AI Inc., Palo Alto, CA (US)

(72) Inventor: Kartik Tiwari, San Francisco, CA (US)

(73) Assignee: Gatik AI Inc., Mountain View, CA (US)

( * ) Notice: Subject to any disclaimer, the term of this patent is extended or adjusted under 35 U.S.C. 154(b) by 798 days.

(21) Appl. No.: 17/259,151

(22) PCT Filed: May 10, 2019

(86) PCT No.: PCT/US2019/031783
§ 371 (c)(1),
(2) Date: Jan. 8, 2021

(87) PCT Pub. No.: WO2019/217859
PCT Pub. Date: Nov. 14, 2019

(65) Prior Publication Data
US 2021/0155253 A1 May 27, 2021

Related U.S. Application Data

(60) Provisional application No. 62/669,586, filed on May 10, 2018.

(51) Int. Cl.
*B60W 50/029* (2012.01)
*B60W 10/18* (2012.01)
(Continued)

(52) U.S. Cl.
CPC .......... *B60W 50/029* (2013.01); *B60W 10/18* (2013.01); *B60W 10/20* (2013.01);
(Continued)

(58) Field of Classification Search
CPC .. B60W 60/0015; B60W 10/18; B60W 10/20; B60W 50/0205; B60W 50/0225; B60W 2520/10
See application file for complete search history.

(56) References Cited

U.S. PATENT DOCUMENTS 6,898,500 B2   5/2005   Kobayashi
7,991,583 B2   8/2011   Balzer et al.
(Continued)

OTHER PUBLICATIONS

International Search Report and Written Opinion for PCT Application No. PCT/US2019031783 mailed Jul. 19, 2019.
(Continued)

*Primary Examiner* — Khoi H Tran
*Assistant Examiner* — Aaron G Cain
(74) *Attorney, Agent, or Firm* — Jeffrey Schox; Diana Lin (57) ABSTRACT

A vehicle control system for controlling a vehicle, including a set of task nodes, wherein each of the set of task nodes compares a failure criterion to input to the task node to generate a failure flag and provides output to at least one other task node of the set of task nodes; an aggregator node directly communicatively coupled to each of the set of task nodes, and wherein the aggregator node: receives a set of failure flags from the set of task nodes, determines a failure tier based on the set of failure flags, and generates a failure tier message defining the failure tier; and, a behavior planning node communicatively coupled to the aggregator node, wherein the behavior planning node: receives the failure tier message, and in response to the failure tier defined by the failure tier message, generates vehicle control instructions.

20 Claims, 4 Drawing Sheets

(51) Int. Cl.
  *B60W 10/20* (2006.01)
  *B60W 50/02* (2012.01)
  *B60W 60/00* (2020.01)

(52) U.S. Cl.
  CPC .... *B60W 50/0205* (2013.01); *B60W 50/0225* (2013.01); *B60W 60/0015* (2020.02); *B60W 2050/021* (2013.01); *B60W 2050/022* (2013.01); *B60W 2050/0292* (2013.01); *B60W 2520/10* (2013.01)

(56) References Cited

U.S. PATENT DOCUMENTS

| | | | |
|---|---|---|---|
| 8,618,922 B2 * | 12/2013 | Debouk | B60W 50/038 340/576 |
| 8,706,915 B2 | 4/2014 | Duchesneau | |
| 8,823,530 B2 | 9/2014 | Green et al. | |
| 8,868,447 B1 | 10/2014 | Terrell | |
| 9,043,073 B2 | 5/2015 | Ricci | |
| 9,137,847 B1 | 9/2015 | Ayyagari et al. | |
| 9,150,200 B2 | 10/2015 | Urhahne | |
| 9,406,177 B2 | 8/2016 | Attard et al. | |
| 9,419,854 B1 | 8/2016 | Wang et al. | |
| 9,465,388 B1 | 10/2016 | Fairfield et al. | |
| 9,529,361 B2 | 12/2016 | You et al. | |
| 10,397,019 B2 * | 8/2019 | Hartung | G05D 1/0077 |
| 2009/0282369 A1 | 11/2009 | Jones | |
| 2012/0197898 A1 | 8/2012 | Pandey et al. | |
| 2013/0018692 A1 | 1/2013 | Guo et al. | |
| 2015/0331422 A1 | 11/2015 | Hartung et al. | |
| 2017/0139411 A1 | 5/2017 | Hartung et al. | |
| 2018/0082192 A1 | 3/2018 | Cormier et al. | |
| 2018/0082207 A1 | 3/2018 | Cormier et al. | |
| 2018/0082208 A1 | 3/2018 | Cormier et al. | |
| 2018/0196434 A1 | 7/2018 | Hartung et al. | |
| 2018/0339709 A1 | 11/2018 | Tiwari et al. | |

OTHER PUBLICATIONS

Schwall et al. "Multi-modal diagnostics for vehicle fault detection", Proceedings of 1-20 IMECE2001: 2001 ASME International Mechanical Engineering Congress and Exposition Nov. 11-16, 2001.

* cited by examiner

VEHICLE CONTROL SYSTEM AND METHOD

CROSS REFERENCE TO RELATED APPLICATIONS

This application claims priority to PCT/US19/31783, filed 10 May 2019, which claims the benefit of U.S. Provisional Application Ser. No. 62/669,586, filed 10 May 2018, both of which are incorporated herein in their entirety by this reference.

TECHNICAL FIELD

This invention relates generally to the vehicle control field, and more specifically to a new and useful system and method in the vehicle control field.

BACKGROUND

In autonomous and semi-autonomous control of automotive vehicles, it can be important to manage control flow in the event of system or component failure. If system or component failure is not identified and analyzed, adequate corrective action and/or response often cannot be taken in a timely and safe manner. Unlike many other robotics applications, the ability to immediately shut down operation and physically cease moving substantially instantaneously is often unavailable or undesirable for moving vehicles, and in particular for freight-bearing vehicles (e.g., semi-trucks) on roadways shared with smaller, more vulnerable vehicles. In addition, control and operation of automotive vehicles can require the impact of each component on vehicle operation (e.g., safe operation, nominal operation, efficient operation, etc.) to be monitored and recorded, and for system and/or component failure to express high traceability; however, these requirements are often inadequately met by conventional solutions to autonomous and/or semi-autonomous vehicle control.

Thus, there is a need in the vehicle control field to create a new and useful system and method to manage system or component failure. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
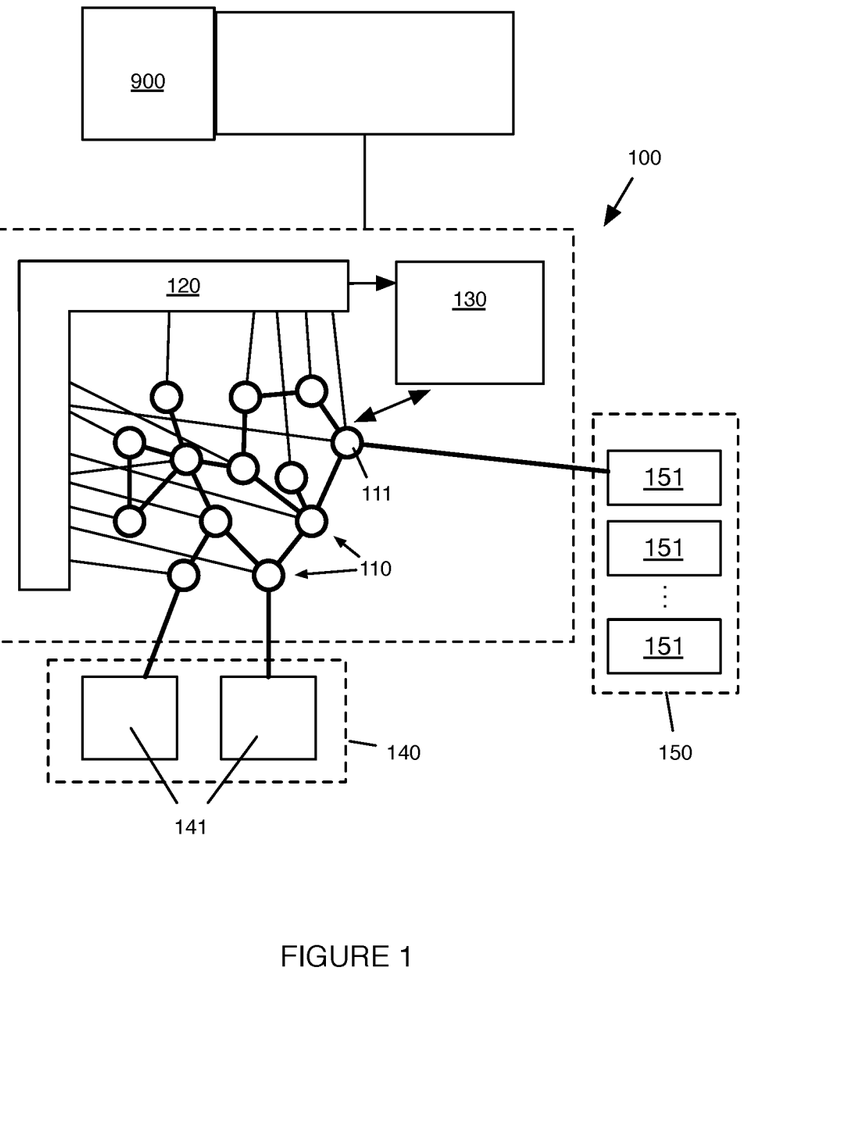
FIG. 1 depicts a schematic illustration of a variation of the vehicle control system.

As shown in FIG. 1, the control system 100 includes a set of task nodes 110, an aggregator node 120 communicatively coupled to each of the set of task nodes, and a behavior planning node 130 communicatively coupled to the aggregator node 120. The control system 100 can optionally include: an actuation subsystem 140, a perception subsystem 150, and any other components suitable for vehicle control. The control system 100 functions to control the operation of a vehicle 900 (e.g., an automotive vehicle). The control system 100 can additionally or alternatively function to manage system and/or component failure during vehicle operation. In variations, the control system 100 can function to apply a tiered failure mode framework to the operation of the system, for at least the practical application of safely and responsibly degenerating the operation of an unmanned vehicle. The control system can also function to provide real-time and/or subsequent (e.g., post-failure) insight into system and/or component failure modes. However, the control system 100 can additionally or alternatively have any other suitable function related to monitoring, managing, and/or mitigating failures in an autonomous and/or unmanned vehicle.

Figure 2:
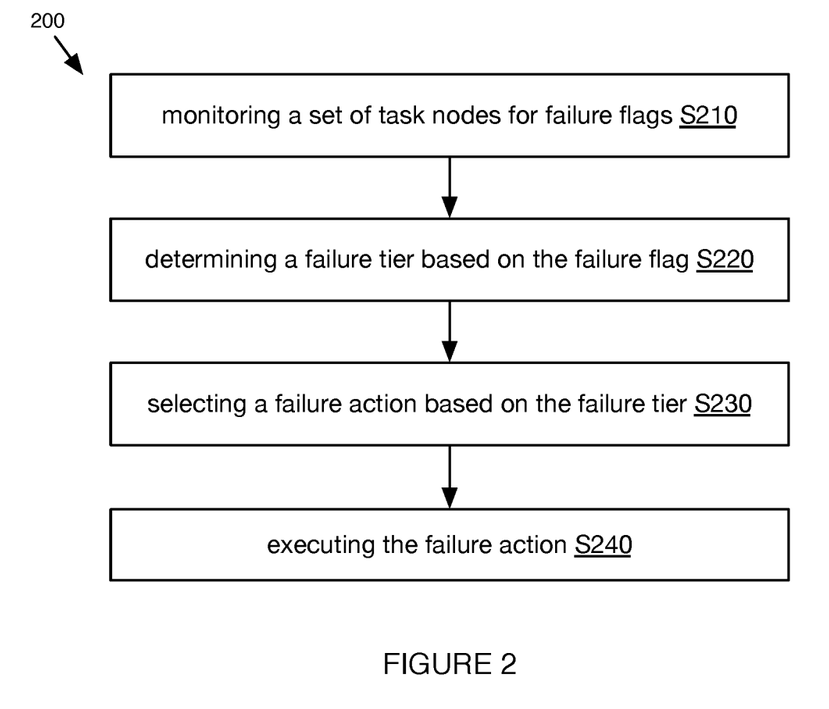
FIG. 2 depicts a flowchart of a variation of the method of using the vehicle control system.

As shown in FIG. 2, the method 200 can include: monitoring a set of task nodes for a set of failure flags S210; determining a failure tier based on the set of failure flags S220; selecting a failure action based on the failure tier S230; and executing the failure action S240. The method 200 can optionally include any other suitable blocks and/or processes for vehicle control. The method 200 functions to manage system and/or component failure in real-time (e.g., near real-time, substantially real-time, etc.) during vehicle operation. The method 200 can also function to record and report system and/or component failure. In variations, the method 200 can function to apply a tiered failure mode framework to the operation of the system, for at least the practical application of safely and responsibly degenerating the operation of an unmanned vehicle. However, the method can additionally or alternatively have any other suitable function related to monitoring, managing, and/or mitigating failures in an autonomous and/or unmanned vehicle.

The control system 100 can include, be implemented by, and/or execute at various related systems. The control system 100 preferably controls a vehicle, such as an automotive vehicle (e.g., a passenger vehicle, a commercial vehicle, a car, a truck, a semi-truck, a tractor-trailer, etc.), a non-automotive vehicle (e.g., a locomotive, a mobile robot, an aerial vehicle, etc.), and any other suitable vehicle. In particular, the vehicle is preferably configured for unmanned operation wherein a human is not in a position to exercise physical control over the operation of the vehicle (e.g., wherein the human is collocated with the vehicle but not in such a position, wherein the human is remotely located and teleoperating or monitoring the vehicle, etc.). However, the vehicle can be otherwise suitably configured. The control system 100 can include or interface with a database (e.g., an onboard database, a remote database, a distributed database, a cloud database, a server, etc.), for such purposes as logging or recording information (e.g., in relation to component failure, failure event data, etc.), retrieving information (e.g., mapping data, environmental data, etc.), and/or any other suitable purpose and/or in relation to any other suitable data. The control system 100 can include and/or interface with a communication system, for such purposes as transmitting and receiving data (e.g., to or from a remote computing system), and/or any other suitable purpose. However, the control system 100 can include, be implemented by, and/or execute at any other suitable related systems.

The method 200 is preferably implemented by a control system substantially analogous to the control system 100 as described herein, but can additionally or alternatively be implemented by any other suitable vehicle control system.

2. Benefits

Variations of the system and method can afford various benefits and/or advantages.

First, variations of the system can enable a transparent control system architecture, which enables system improvement and development without compromising system reliability or safety. The control system architecture can be transparent to control system developers; for example, the responsibility of each piece of the system (e.g., task node) for generating failure flags can be substantially identical across all components, irrespective of the task associated with each component. The mechanism for generating failure flags can also be substantially identical for each system component (e.g., task node) irrespective of the task associated with the component, though the criteria for generating various types of failure flags can differ by the type of task; this property can enhance transparency to system developers during system development (e.g., iterative development, ongoing development, continuous development, etc.). For example, a task node m that performs an aspect of lane line detection can define a different implementation in software than a task node m that performs an aspect of lateral position control, but both task nodes can apply a failure criterion (e.g., a bounds check, a value check, etc.) on the output that generates a failure flag with substantially identical characteristics.

Second, variations of the system and method can enable efficient and transparent review of vehicle control performance (e.g., event data related to discrete occurrences during vehicle operation that triggered a behavioral response of the control system; system computational performance metrics such as accuracy, latency, etc.; component performance; etc.). For example, variations of the system can log traceable failures on a component by component basis to enable system failures to be reviewed and diagnosed subsequent to a failure (e.g., a failure event). In another example, variations of the system and method can enable the frequency of failure of system components (e.g., software modules, task nodes, hardware components driven by the control system, etc.) to be determined (e.g., in relation to standards associated with automotive safety and/or control systems). In another example, disengagements of the vehicle control system can be traced back to the root cause (e.g., tracing the progression of a component and/or system failure from an initial failure flag to promotion of the failure flag through a set of tiered responses to an ultimate disengagement of the vehicle control system and associated need for human intervention).

Third, variations of the system and method can enable responsible degeneration (e.g., wind-down, cessation, etc.) of autonomous operation in the event of system and/or component failure. Responsible degeneration preferably includes safe and managed de-escalation of autonomous behaviors until the vehicle is in an inert state (e.g., non-moving and not capable of initiating movement or other behaviors without a human providing control input). Responsible degeneration (e.g., operation in a degenerate mode) can include taking immediate, irreversible action to stop the vehicle (e.g., in the current lane of travel on the highway), which can, in some examples, be referred to as an "uncontrolled action" because once the action is initiated (e.g., an emergency stop condition is reached) it preferably cannot be reversed (e.g., controlled) by the control system. Responsible degeneration can also include taking controlled action (e.g., reversible action) to stop the vehicle (e.g., pulling over to a shoulder, making a controlled stop in a lane, etc.) and/or otherwise mitigate the component failure (e.g., slowing to below a threshold speed and transitioning to teleoperation control of the vehicle in the event of failure of long-range object detection task nodes).

Fourth, variations of the system and method can enable high speed (e.g., low latency) response to system and/or component failure. Monitoring of failure flags can be continuously performed, such that system failures, component failures, and/or recurrent errors are not missed and/or overlooked until mitigation actions must be aggressive in order to responsibly manage failure. For example, substantially continuous monitoring of the task nodes responsible for long range object detection can enable a failure of one or more of those task nodes to be mitigated prior to any undetected objects entering a region around the vehicle that would require aggressive evasive action that could in turn reduce the safety of the vehicle and/or surrounding entities.

However, variations of the system and/or method can otherwise suitable afford any suitable benefits and/or advantages.

3. System

As shown in FIG. 1, the control system 100 includes a set of task nodes 110, an aggregator node 120 communicatively coupled to each of the set of task nodes, and a behavior planning node 130 communicatively coupled to the aggregator node 120 and at least one of the set of task nodes. The control system 100 can optionally include: an actuation subsystem 140, a perception subsystem 150, and any other components suitable for vehicle control (e.g., perception, planning, decision making, actuation, etc.). The control system 100 functions to control the operation of a vehicle (e.g., an automotive vehicle, a semi-tractor trailer, any other suitable vehicle, etc.). The control system 100 can also function to operate the vehicle in response to a failure according to a tiered response structure, which preferably includes three tiers wherein the highest tier (e.g., most severe failure) is tier I, middle tier is tier II, and lowest tier (e.g., least severe failure) is tier III. The tiered response structure can additionally or alternatively include any suitable number of tiers. The control system 100 can additionally or alternatively function to manage system and/or component failure during vehicle operation, provide real-time and/or subsequent insight into system and/or component failure modes, and have any other suitable function.

3.1 Task Nodes

Figure 3:
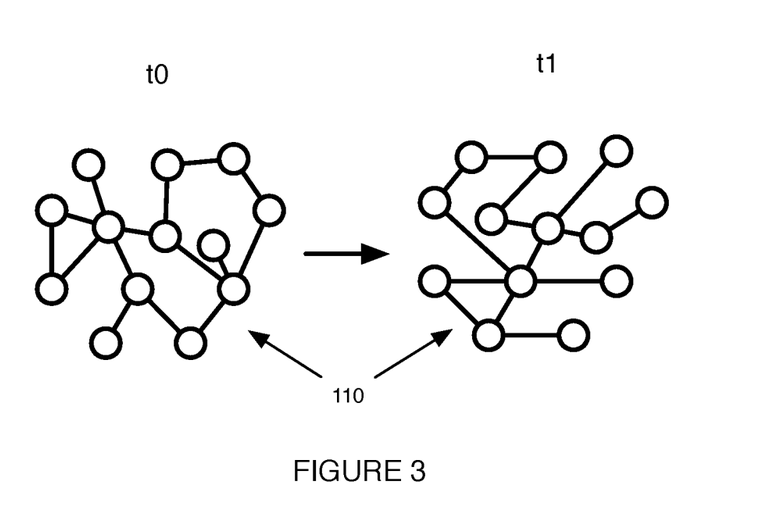
FIG. 3 depicts an example time evolution of connectivity of a variation of a task node network of the vehicle control system.

The set of task nodes functions to collectively perform the set of tasks used to operate a vehicle in any suitable driving environment, and in response to any suitable inputs (e.g., environmental inputs such as weather, object perception inputs, other perception inputs, planning inputs, control inputs, etc.). The set of task nodes can be interconnected (e.g., between inputs and outputs of task nodes) in any suitable manner, and the inter-node connections can dynamically change in response to any suitable situational change (e.g., as shown in FIG. 3). Each task node 111 preferably "subscribes" to the output of at least one other task node 111 and/or an external sensor 151, and each task node 111 preferably "publishes" its own output to at least one other task node 111 and/or external actuator 141 or other device; task nodes can subscribe to a plurality of other task nodes and/or devices and publish to a plurality of other task nodes and/or devices. The interconnected set of task nodes can additionally or alternatively be referred to as a network of task nodes (e.g., a task node network). Each of the set of task nodes can connect to the aggregator node 120 for data transfer (e.g., transmission of failure flags to the aggregator node), such that failure of any node of the set of nodes is observed by the aggregator node 120 of the system. The set of task nodes can be redundant (e.g., the set of task nodes can include subsets of task nodes that are duplicates and perform the same task as at least one other task node), but can alternatively be a set of unique task nodes (e.g., wherein each task is performed by only one task node).

A task node 111 of the set of task nodes functions to perform a task (e.g., execute a series of instructions, execute a model or portion of a model, etc.) related to vehicle control and/or operation. Each task node 111 can also function to raise a failure flag of any suitable tier (e.g., a tier I, tier II, or tier III flag). The task node 111 can also function to subscribe to the output of a different node (e.g., another task node of the set of task nodes), wherein the task node 111 receives data (e.g., processed data, computational output, etc.) from the node to which it is subscribed. Similarly, the task node 111 can function to publish its output, wherein its output is provided to a different node that subscribes to its published output (e.g., for further processing by the network). However, a task node 111 of the set of task nodes can additionally or alternatively have any other suitable function.

In some variations, the task node 111 is defined as a software module with distinct expected inputs and outputs (e.g., a software driver for a camera). A task node 111 can be defined as a collection of other task nodes (e.g., a lane-change task node can include a turn signal task node, an accelerate task node, and a steering task node) and/or define a single primitive task (e.g., accelerate to a target speed, apply the brakes by a target amount, etc.). The expected inputs are preferably based on the subscriptions of the task node 111 to other task node(s), and the outputs are preferably the published outputs provided to the set of other task nodes that subscribe to the task node; however, the inputs and outputs can be otherwise suitably defined. The task node 111 can be defined either purely as software (e.g., a set of predetermined, computer-executable instructions that process digital input into digital output), as a combination of software and hardware (e.g., a set of predetermined, computer-executable instructions that process digital input into the physical output of a hardware device such as the position of a servo or content of a display, and can include the generation of analog output), purely as hardware (e.g., the physical manifestation of executable instructions in an integrated circuit, the electromagnetic transducer associated with an actuator, etc.), and/or be otherwise suitably defined.

The task node 111 preferably includes a node-specific predetermined set of instructions (e.g., internal logic, comparator with a failure criterion, bounds check, etc.) that functions to analyze its own operation, and in particular to determine whether the task node 111 itself has failed (e.g., met a failure condition, failed to meet a pass condition, etc.). For example, the task node 111 can include instructions that evaluate its own output (e.g., the published output) to determine whether or not the output is out of bounds (e.g., wherein the output includes values that should be numerical but are infinite, represented by an Inf character, and/or undefined) by comparing the output to a failure criterion defining the bounds. In another example, the task node 111 can include output check logic that evaluates its own output to determine whether the output is anomalous (e.g., different from an expected value or range of values by greater than a threshold magnitude). However, the task node 111 can additionally or alternatively perform operational checks on itself in any other suitable manner.

The task node 111 preferably raises a failure flag in response to failure of the task node 111 (e.g., within or during the execution of the task defined by the task node, processing of data by the task node, etc.), and communicates the failure flag to the aggregator node 120. In some variations, the failure flag does not have an associated tier and is identical across task nodes, and the failure tier is determined at the aggregator node 120 based on characteristics of the flag (e.g., the frequency with which it is generated over an interval of time or time window, the task associated with the task node 111 that raised the failure flag, etc.). In additional or alternative variations, the failure flag itself can be associated with various tiers (e.g., a tier I failure flag, a tier II failure flag, a tier III failure flag, etc.) upon generation (e.g., as metadata), and the determination of the failure tier by the aggregator node 120 can be based on the metadata associated with the failure flag. The tier of the failure flag can, in some instances, correspond to the type of failure designated by the tier (e.g., according to a tiered response structure as described below). However, the task node 111 can additionally or alternatively raise a failure flag in any other suitable manner.

In a first variation, every task node 111 of the set of task nodes can raise a lowest-level failure flag (e.g., a tier III failure flag), and any task node 111 of the set of task nodes that interfaces with a hardware touchpoint (e.g., a task node including a hardware driver for an actuator 141 of the actuation subsystem 140, a task node in direct communication with a portion of the actuation subsystem, etc.) can raise a highest-level failure flag (e.g., a tier I failure flag), and no task nodes can raise a mid-level failure flag (e.g., a tier II failure flag), which is instead raised by the aggregator node 120 in response to receiving one or more tier III failure flags (e.g., by determining that a tier II failure has occurred in response to the characteristics of the received failure flags). In an example of such a variation, the aggregator node 120 can determine that a tier II failure has occurred in response to receiving one or more failure flags (e.g., tier III failure flags) over a period (e.g., a time period, a time window) exceeding a threshold duration (e.g., a predetermined threshold duration, a dynamically determined threshold duration based on the context or operating environment of the vehicle, etc.). In another example of such a variation, the aggregator node 120 can determine that a tier II failure has occurred in response to receiving a number of failure flags above a threshold number (e.g., a predetermined threshold number, a dynamically determined threshold number based on the context or operating environment of the vehicle, etc.). However, in alternative variations, any suitable task node 111 of the set of task nodes can raise a failure flag, which can have any suitable level or tier and/or be independent of the level or tier.

3.2 Aggregator Node

The aggregator node 120 functions to monitor the failure flag outputs of each of the set of task nodes. The aggregator node 120 can also function to report a failure to the behavior planning node 130 along with an associated failure tier and/or other failure metadata. The aggregator node 120 can also function to determine a list of operable task nodes (and/or a list of inoperable task nodes, nonfunctional task nodes, functional task nodes, etc.), and perform an action based on the list of task nodes (e.g., report the list of task nodes to the behavior planning node 130, determine a failure tier based on the list of task nodes, compare the list of task nodes against a failure criterion, etc.). The aggregator node 120 can also function to record and/or report a failure description (e.g., metadata associated with the failure flag). The aggregator node 120 can also function to promote a failure flag from a lower tier to a higher tier (e.g., a tier III flag to a tier II flag, a tier II flag to a tier I flag, etc.), or otherwise suitably determine a failure tier based on one or more received failure flags. However, the aggregator node 120 can additionally or alternatively have any other suitable function.

The aggregator node 120 is preferably communicatively coupled directly to each node of the set of task nodes, such that the shortest communication path between a task node 111 and the aggregator node 120 is one path segment (e.g., as shown in FIG. 1). However, in additional or alternative variations, the aggregator node 120 can be indirectly communicatively coupled to one or more of the nodes of the set of task nodes. The communication pathways (e.g., data transfer connections, data pathways, etc.) between the aggregator node 120 and each of the set of task nodes are preferably one-way such that the aggregator node 120 can receive information (e.g., failure flags, failure flag metadata, etc.) from the task nodes but does not transmit information thereto. However, in alternative variations, the communication pathways between the aggregator node 120 and each of the set of task nodes can be two-way such that information can be both received and transmitted.

In variations, the aggregator node 120 can generate a list of functional task nodes based on the received failure flags from each of the set of task nodes. The list of functional task nodes can be positively defined, such that each task node 111 on the list of functional task nodes is an operational (e.g., correctly functioning) task node 111 and the receipt of a failure flag from a task node 111 removes the task node 111 (and/or an identifier thereof) from the list. The list of functional task nodes can additionally or alternatively be negatively defined, such that each task node 111 on the list of functional task nodes is a failed task node 111 (e.g., a task node from which a failure flag has been received); in such cases, the list of functional task nodes can be referred to as a list of nonfunctional task nodes. For example, the aggregator node 120 can generate a list of nonfunctional task nodes from the set of task nodes, based on the set of failure flags, wherein the set of failure flags received correspond to the task nodes on the list of nonfunctional task nodes. The list of task nodes (e.g., functional, nonfunctional) can be adjusted at the frequency at which failure flags are received by the aggregator node 120 (e.g., once per clock cycle, once per update period, etc.). However, the list of functional task nodes can be otherwise suitably defined such that it can be used to generate a comparison between available task nodes (e.g., task nodes that are functioning nominally, correctly, etc.) and desired task nodes for a selected failure action (e.g., wherein the behavior planning node selects a failure action in response to a report from the aggregator node).

In a specific example, the list of task nodes is defined with respect to task nodes that are not functioning nominally (e.g., as a list of nonfunctional task nodes). In this example, the list of nonfunctional task nodes corresponding to a tier one failure and associated response action (e.g., failure action, failure response action, etc.) includes any task node 111 that has a shortest path segment of one between it and an actuation element (e.g., is directly communicatively coupled to and/or publishes output to an actuation element in order to actuate the vehicle, wherein the published output of at least one task node 111 on the list controls an actuator of the actuation subsystem, etc.). In a related example, the list of nonfunctional task nodes corresponding to a tier one failure and associated response action includes any task node 111 that has a shortest path segment of one between it and a sensor 151 (e.g., sensing element) of the perception subsystem 150 (e.g., is directly communicatively coupled to and/or subscribes to input from a sensing element).

The aggregator node 120 can, in variations, determine a failure tier based on promoting a low-level failure tier (e.g., a tier III failure determined based on receipt of a single failure flag) to a higher tier (e.g., a tier II failure, a tier I failure, etc.). Promoting a failure tier can be based on a duration over which the failure flag is repeatedly received from the same task node; for example, the aggregator node 120 can determine a tier II failure has occurred (e.g., and generate a tier II failure message) based on receiving a failure flag periodically (e.g., every computational cycle, at 10 Hz, at any other suitable frequency or with any other suitable period, etc.) for a period of time (e.g., a predetermined period of time, a predetermined time window, a specified period of time, a dynamically determined period of time, etc.), above a threshold duration. For example, the aggregator node 120 can determine the failure tier in response to a task node 111 of the set of task nodes 110 generating a failure flag for a time period exceeding a threshold duration. The threshold duration can be predetermined (e.g., a fixed threshold that applies to each task node, a different fixed threshold that is associated with each task node, a 0.5 second threshold, a 1 second threshold, a 50-millisecond threshold, etc.). The threshold duration can be dynamically determined and/or otherwise depend on the characteristics of the one or more failure flags received by the aggregator node 120. For example, the threshold duration can be inversely proportional to the number of task nodes that receive the published output of the task node 111 generating the failure flag (e.g., wherein the number of task nodes subscribed to the task node that raised the failure flag can be received by the aggregator node 120 along with the failure flag as metadata).

Promoting a failure tier can additionally or alternatively be based on the number of failure flags received from different task nodes (e.g., wherein the aggregator node determines the failure tier based on a number of failure flags of the set of failure flags received within a predetermined time window). For example, the aggregator can determine that a tier II failure has occurred in response to receiving a number of failure flags (e.g., wherein each failure flag received individually indicates a tier III failure), from unique task nodes, above a threshold number within a time window. The threshold number and the length of the time window can be predetermined, dynamically determined, and/or otherwise suitably determined.

However, promoting a failure tier to a higher failure tier can be otherwise suitably performed with any other suitable basis.

The aggregator node 120 can generate a failure message based on received failure flags (e.g., characteristics of the received failure flag). The generated failure message can be of the same tier or level as that associated with the received failure flags, or of a different (e.g., higher, more severe, etc.)

tier or level. For example, the aggregator node 120 can generate a tier I failure message based on a number of tier II failure flags received within a time window (e.g., from the same task node, from different task nodes, etc.). The failure message is provided to the behavior planning node 130 by the aggregator node 120, and functions to initiate a failure response (e.g., a response action, a failure response action, a failure action, etc.) by the behavior planning node 130. However, the aggregator node 120 can generate a failure message based on received failure flags in any other suitable manner.

3.3 Behavior Planning Node

The behavior planning node 130 functions to operate the vehicle in a degenerate mode (e.g., failure management mode) in response to a report from the aggregator node 120 (e.g. a report including a failure message, the failure message itself, a report including a list of operable task nodes, etc.). The behavior planning node 130 can also function to process input from the perception subsystem 150 to plan vehicle behavior. The behavior planning node 130 can also function to process input from the set of task nodes 110 to plan vehicle behavior. The behavior planning node 130 can also function to generate control outputs to operate the vehicle (e.g., using the actuation subsystem) during nominal vehicle operation (e.g., wherein no failure flags above a threshold failure level are received), wherein the control outputs can be provided directly to the actuation subsystem 140 and/or to the actuation subsystem 140 or other devices by way of the set of task nodes 110. The behavior planning node 130 can additionally or alternatively have any other suitable function.

Figure 4:
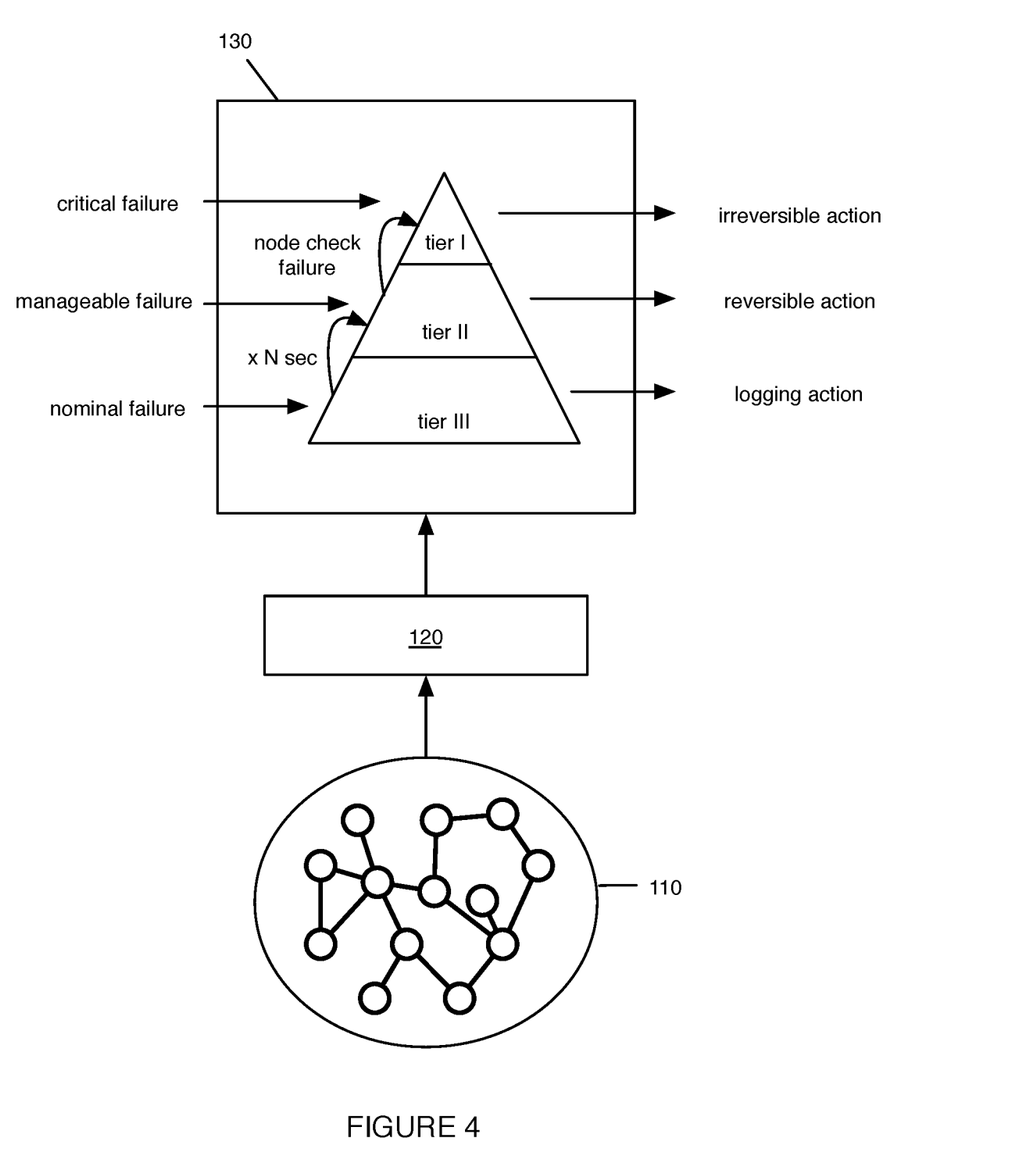
FIG. 4 depicts an example architecture of the vehicle control system including a tiered response structure.

The degenerate mode can include a tiered response structure defining a set of tiers, each tier of the set of tiers associated with a response that defines a set of failure actions (e.g., response actions, failure response actions, etc.). In a first variation of the behavior planning node 130, as shown in FIG. 4, the tiered response structure includes three tiers, wherein a tier I failure corresponds to a critical failure (e.g., wherein the vehicle cannot be successfully autonomously operated within nominal limits defined by the operational design domain and should be brought to a stop immediately to avoid exceeding the safe operation limitations of the system), a tier II failure corresponds to a manageable failure (e.g., wherein the vehicle is functionally capable of being brought to a controlled stop), and a tier III failure corresponds to a nominal component-level failure (e.g., that does not adversely affect autonomous vehicle operation, due to the component being redundant with another component or set of components or for any other suitable reason). However, the tiered response structure can have any suitable number of tiers, wherein each tier corresponds to any suitable failure type that in turn calls for any suitable response and associated set of failure actions.

In the first variation of the behavior planning node 130, receipt of a tier I failure message at the behavior planning node 130 results in the behavior planning node 130 executing a failure action that includes taking an irreversible action (e.g., bringing the vehicle to an immediate stop), wherein no vehicle system (e.g., onboard control system, teleoperator, etc.) can abort (e.g., reverse) the irreversible action once initiated. Control authority can be applied to action-related (e.g., stopping-related) systems during an irreversible stop (e.g., a feedback control loop can be applied to a brake actuator to prevent lockup during stoppage); however, unrelated control inputs (e.g., control inputs related to any task that is not stopping the vehicle) are ignored until the action is fully executed (e.g., the vehicle is brought to a complete stop) in this and related variations. In a first example of an irreversible action, a default-closed relay is closed in response to a tier I failure (e.g., a loss of power to the brake actuator) and the brakes are automatically applied by the default-closed relay that closes upon the occurrence of the failure. However, the irreversible action can be any other suitable action that is automatically (e.g., without active intervention by the control system during execution of the action) executed to completion in response to a tier I failure.

Further examples of failure actions that can be taken in addition to executing an irreversible stop can include deploying and/or activating emergency signals (e.g., emergency flashers of the vehicle, strobes, sirens, etc.), transmitting a request for human assistance (e.g., notifying a teleoperator that the vehicle has automatically brought itself to a halt in response to a failure of tier one or tier two, etc.), and/or any other suitable action in response to failure.

A tier I failure flag is preferably raised (e.g., by any task node of the set of task nodes, by the aggregator node 120, by the behavior planning node 130, etc.) in response to a critical failure (e.g., a critical failure substantially as described above) of the system or a component thereof. Such critical failures can include: failure of any hardware touch points 141 of the system (e.g., actuator touch points), wherein a task node 111 interfaces directly with hardware that physically manipulates control inputs of the vehicle (e.g., a task node 111 including a driver for a steering input actuator, a task node 111 including an encoder for a pedal actuator position, etc.); failure of the behavior planning node 130 itself (e.g., wherein any diagnostic check associated with operation of the behavior planning node 130 itself fails, wherein the behavior planning node 130 computationally freezes or crashes, etc.); promotion of a tier II failure to a tier I failure based on promotion criteria (e.g., as described below); and, any other suitable failure that prevents successful vehicle operation (e.g., successful autonomous vehicle operation).

In the first variation of the behavior planning node 130, receipt of a tier II failure report at the behavior planning node 130 results in the behavior planning node 130 executing a failure action that includes taking a reversible action (e.g., bringing the vehicle to a controlled stop). This failure action can include selecting a controlled stop task from a prioritized list of controlled stop tasks (e.g., degradation behaviors), wherein the controlled stop task is selected based on the availability of functional task nodes. Each controlled stop task is associated with a list of required task nodes, and the behavior planning node 130 selects the controlled stop task in this variation by comparing a list of functional task nodes (e.g., received in a report or message from the aggregator node) to the list of required task nodes. Upon determination that at least one of the required task nodes is not represented in the list of functional task nodes associated with the first controlled stop task, the behavior planning node 130 performs the same operation (i.e., comparing the list of required and functional task nodes) with respect to the second controlled stop task in the prioritized list, and repeats this until the end of the prioritized list is reached. In this variation, in the event that no controlled stop task is successfully validated (e.g., wherein all the required task nodes for the controlled stop task are not represented in the list of functional task nodes), the behavior planning node 130 promotes the tier II failure to a tier I failure and executes a suitable tier I failure action (e.g., an irreversible action as described above).

In a first example, the prioritized list of controlled stop tasks includes: first, pulling over to the shoulder; second, slowing down to less than a threshold speed and transferring control of the vehicle to a teleoperator; and, third, performing a controlled stop in the lane in which the vehicle is traveling. However, in alternative variations and/or examples, the prioritized list of controlled stop tasks can include any other suitable tasks, and/or any number of suitable tasks (e.g., more than three, fewer than three, etc.).

A tier II failure flag is preferably raised (e.g., by any task node of the set of task nodes, by the aggregator node 120, by the behavior planning node 130, etc.) in response to a duration of a tier III failure flag exceeding a threshold duration. The threshold duration is preferably based on the nature of the task node 111 raising the tier III failure flag; for example, a tier II failure flag can be raised in response to a task node in that operates a turn signal raising a tier III failure flag over an interval of at least 1 second, whereas a tier II failure flag can be raised in response to a task node 111 that processes wide-view image data raising a tier III failure flag over an interval of 500 milliseconds. However, the threshold duration can additionally or alternatively be based on the number of other task nodes to which the failing task node 111 is subscribed (e.g., wherein a greater number of nodes corresponding to a shorter duration), a category associated with the failing task node 111 (e.g., a perception-based task node, an actuation-based task node, a speed governor task node, etc.), and have any other suitable basis. The threshold duration is preferably a time duration (e.g., a number of milliseconds, a number of seconds, etc.), but can additionally or alternatively be a cycle duration (e.g., a number of computational cycles performed by the failing node), a sample duration (e.g., a number of frames sampled from a camera of the perception subsystem 150, a number of samples of an onboard gyroscope, etc.), and any other suitably defined duration. However, a tier II failure flag can additionally or alternatively be otherwise suitably raised.

In the first variation of the behavior planning node 130, receipt of a tier III failure report at the behavior planning node 130 results in the behavior planning node 130 executing a failure action that includes recording (e.g., logging, a recording action, etc.) information associated with the tier III failure report (e.g., traceback information, elapsed time since the last tier III failure associated with the node that raised the tier III failure, the perception subsystem state associated with the tier III failure, etc.). The behavior planning node 130 can also log (e.g., record) the time point associated with receipt of the tier III failure (e.g., in order to determine that a failure flag should be promoted to a higher tier, such as a tier II failure, due to having received the tier III failure repeatedly over a predetermined time period as shown by example in FIG. 5).

Figure 5:
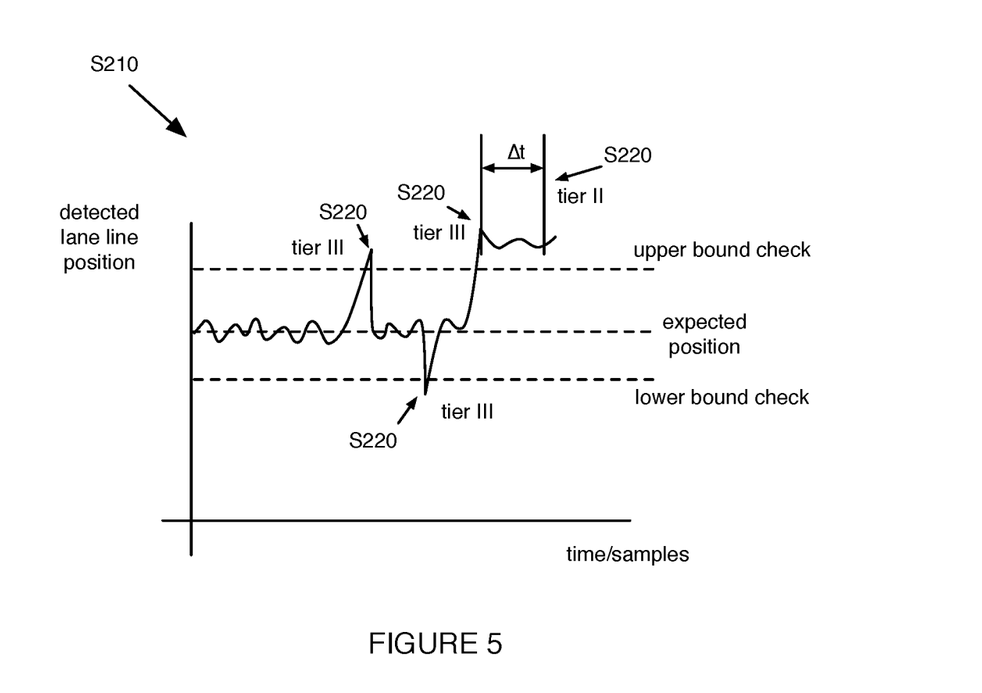
FIG. 5 depicts an example dataset corresponding to tiered failure recognition in accordance with the vehicle control system and method of use thereof.

A tier III failure flag is preferably raised (e.g., by a task node of the set of task nodes) in response to any off-nominal operation of the task node 111 raising the tier III failure flag. Such off-nominal operation, preferably determined by comparison of the input or output to the node with a failure criterion but alternatively otherwise suitably determined, can include: a bounds check failure of published output or subscribed input, a logic check failure of internal computations (e.g., computations performed by the task node) or other data, a momentary lane-following failure (e.g., a spiked lane line detection output as shown in FIG. 5), an object detection failure in an image frame or image sequence, and any other suitable failure of any other component that does not interface with hardware actuation components of the system (e.g., wherein task nodes interfacing with hardware actuation components raise tier I failure flags in response to failures instead of tier III failure flags). However, a tier III failure flag can additionally or alternatively be otherwise suitably raised.

However, in alternative variations, receipt of a failure report associated with any suitable tier at the behavior planning node 130 can result in execution of any suitable failure actions.

3.4 Actuation Subsystem

The control system 100 can include an actuation subsystem 140 that functions to actuate the control interfaces of the vehicle. The actuation subsystem 140 can also function to execute a selected vehicle action (e.g., a failure action determined by the behavior planning node 130). Control interfaces actuated by the actuation subsystem 140 can include human-oriented control interfaces, computer control interfaces, and any other suitable control interfaces. Human-oriented control interfaces can include, for example, a steering wheel, pedals (e.g., clutch pedal, gas pedal, brake pedal, etc.), a shifter (e.g., shift lever, shift paddle, etc.), and any other suitable control mechanism configured for operation by a human. Computer control interfaces can include, for example, a throttle actuation interface (e.g., a controllable fuel flow rate regulator), a brake actuation interface (e.g., redundant brake calipers, electronic control mechanism for existing brakes, etc.), a transmission actuation interface (e.g., an electronically-controllable automatic transmission), and any other suitable control interface configured to receive control instructions from a computing system.

The actuation subsystem 140 can receive inputs, including control instructions and/or operator inputs. Control instructions are preferably received from the behavior planning node 130, and can include voltage levels, current levels, time-varying signals, constant signals, trigger- and/or event-based signals, and any other suitable instructions and/or parameters that can effect an output of the actuation subsystem 140 (e.g., an actuation of a control interface by the actuation subsystem). However, control instructions can additionally or alternatively be received from any suitable system component or subsystem (e.g., a task node, a failsafe mechanism, etc.). Operator inputs are preferably received from an operator (e.g., a driver in the vehicle, a teleoperator, etc.), and can include a human moving the steering wheel by hand, a human depressing a pedal manually, a transmission from a teleoperator including instructions to actuate a portion of the actuation subsystem 140, and any other suitable inputs from an operator.

In variations, the actuation subsystem 140 can be controlled by the behavior planning node 130 in combination with the set of task nodes 110. The actuation subsystem 140 preferably actuates control inputs of the vehicle to navigate the vehicle along a roadway in response to the vehicle control instructions (e.g., generated by the behavior planning node 130, received from a teleoperator at the vehicle control system, etc.). However, the actuation subsystem 140 can additionally or alternatively be directly controlled by a human operator (e.g., a teleoperator, a human within the vehicle in a passenger position, a human within the vehicle in a driver position, etc.) and/or otherwise suitably controlled.

In a specific example, the vehicle control instructions corresponding to the reversible response action (e.g., controllable stop, reversible action, reversible response, etc.) actuate a first actuator 141 (e.g., a steering actuator) of the actuation subsystem 140 and a second actuator 141 (e.g., a brake actuator) of the actuation subsystem 140 to bring the vehicle to a stopped condition at a righthand side of the roadway (e.g., a shoulder, a rightmost lane, etc.).

In another specific example, the vehicle control instructions corresponding to the irreversible response action actuate the brake actuator to bring the vehicle to a stopped condition at a current instantaneous lateral position of the vehicle in the roadway (e.g., at its present lateral location within the lane, which can be the center of the lane and/or anywhere within the lane) and within a longitudinal position equal to the stopping distance once the brakes are applied (e.g., execute an immediate emergency stop in the roadway). In this example, the irreversible response action is executed immediately upon receipt of a failure message defining the failure tier corresponding to the irreversible response action (e.g., a message from the aggregator node 120 that a tier one failure has occurred, a determination by the behavior planning node that a tier one failure has occurred, etc.). However, in additional or alternative examples, the irreversible response action can include any other suitable response to failure that renders the vehicle inert (e.g., stopped and only able to be reactivated with human intervention).

3.5 Perception Subsystem

The control system 100 can include a perception subsystem 150 that functions to perceive the surroundings of the vehicle. The perception subsystem 150 can also function to collect localization data and mapping data (e.g., simultaneously, in order to perform simultaneous localization and mapping/SLAM). The perception subsystem 150 can additionally function to collect vehicle operation data (e.g., time series data corresponding to the state of vehicle components during operation), and to record measurements indicative of the driving context (e.g., ambient environment parameters, vehicle location, etc.) and provide outputs (e.g., recorded measurements, processed sensor data, etc.) to the task node network and/or behavior planning node 130 (e.g., as signals, messages, etc.). Inputs to the perception subsystem 150 include sensor data, such as image data (e.g., still images, video streams, compressed image sequences, etc.), range data (e.g., time-of-flight/ToF data, LIDAR data, radar data, stereocamera data, optical flow data, point cloud data, etc.), environmental data (e.g., position data, temperature data, humidity data, etc.), and any other suitable sensor data. Inputs are preferably received from one or more sensors 151, which can be on-board the vehicle, removed from the vehicle (e.g., remote), or in any other suitable location. Outputs of the perception subsystem 150 can include the sensor data (e.g., raw data, unprocessed digitized image data, etc.), as well as data derived from the sensor data, such as fused data (e.g., image and range data that has been combined at a processor to increase accuracy or for any other suitable reason), otherwise processed data (e.g., classified objects, position of object center-of-mass/CoM, object extent in three- or two-dimensional space, object trajectory, etc.), and any other suitable data. Outputs of the perception subsystem 150 and/or components thereof (e.g., sensors) are provided to one or more task nodes of the set of task nodes 110, and/or to the behavior planning node 130; exemplary sensor measurements provided to the set of task nodes 110 and/or behavior planning node 130 include visual markers on the roadway, navigation data (e.g., map position data, GPS data), RADAR data, orientation sensor data, ambient environmental data (e.g., acoustic data, temperature data, etc.), and any other suitable sensor data.

Examples of sensors 151 and/or data sources on-board the vehicle include: an inertial measurement unit (IMU), ultrasonic sensors, a data port (e.g., on-board diagnostic module port/OBD port), GPS sensor(s) and modules, cameras (e.g., stereoscopic cameras, single lens cameras, etc.), navigation sensors (e.g., LiDAR, radar, ToF, etc.), position sensors (e.g., actuator position sensors, LVDT sensors, etc.), encoders (e.g., rotary encoders that measure the angular position and/or velocity of rotary actuators of the vehicle and/or vehicle control systems), and any other suitable on-board sensors. The aforementioned sensors of the perception subsystem 150 can additionally or alternatively be located remote from the vehicle (e.g., a stationary roadside sensor, a traffic camera, etc.) and transmit sensor data to the vehicle.

Sensor data can be pre-processed by one or more task nodes in communication with the perception subsystem 150, prior to provision to the behavior planning node 130 and/or other components of the control system. Pre-processing can be performed on camera data, GPS data, radar and/or other range data, and any other suitable data. For example, camera data (e.g., images) can be processed to extract lane markings, vehicle objects, visual landmarks (e.g., stop signs, pedestrian crossing signs, buildings, etc.), and any other suitable features. In another example, GPS coordinates can be combined with a map of the vehicle route (e.g., retrieved from a remote server, stored in an onboard database, etc.) to provide navigation data. In another example, radar signatures (e.g., point cloud data) are reduced to trajectories of vehicles in the field of view (FoV) including the velocity and range of the vehicles.

3.6 Additional Specific Examples

In a specific example, the vehicle control system 100 for controlling a vehicle includes a set of task nodes 10, an aggregator node 120 directly communicatively coupled to each of the set of task nodes 10, and a behavior planning node 130 communicatively coupled to the aggregator node 120. In this example, each of the set of task nodes 110 is communicatively coupled to and receives subscription input from either another task node 111 of the set of task nodes 110 or a sensor of the perception subsystem 150 of the vehicle; compares a failure criterion to the subscription input to generate a failure flag and transforms the subscription input into published output, and provides the published output to either another task node 111 of the set of task nodes 10 or an actuator 141 of the actuation subsystem 140 of the vehicle. In this example, the aggregator node 120 receives a set of failure flags from the set of task nodes 110 and determines a failure tier based on the set of failure flags. The failure tier determined by the aggregator node 120 in this example is one of a first tier, a second tier, and a third tier, wherein the first tier is associated with an irreversible response action, the second tier is associated with a reversible response action, and the third tier is associated with a logging action. The aggregator node 120 determines the failure tier and generates a failure tier message that defines the failure tier, and provides the failure tier message to the behavior planning node 130. In this example, the behavior planning node 130 receives the failure tier message, and in response to the failure tier defined by the failure tier message, generates vehicle control instructions corresponding to one of the logging action, the reversible response action, and the irreversible response action.

4. Method

As shown in FIG. 2, the method 200 includes: monitoring a set of task nodes for failure flags S210; determining a failure tier based on the failure flag S220; selecting a failure action based on the failure tier S230; and executing the failure action S240. The method 200 can optionally include any other suitable blocks and/or processes for vehicle control. The method 200 functions to manage system and/or component failure in real-time (e.g., near real-time, substantially real-time, etc.) during vehicle operation. The method 200 can also function to record and report system and/or component failure, and have any other suitable function.

Block S210 includes monitoring a set of task nodes for failure flags. Block S210 functions to detect system and/or component failure in an operating vehicle control system. Block S210 is preferably performed by an aggregator node substantially as described above, but can additionally or alternatively be performed by any other suitable system or system component.

In variations, Block S210 can include generating a list of nonfunctional task nodes based on the set of failure flags (e.g., wherein each task node that raises a failure flag is placed on the list of nonfunctional task nodes). However, Block S210 can additionally or alternatively include performing any suitable function of an aggregator node or variation thereof substantially as described above, and/or any other suitable action.

Block S220 includes determining a failure tier based on the set of failure flags (e.g., wherein the set of failure flags can include a single failure flag). Block S220 functions to associate the failure flag with its corresponding failure tier (e.g., based on metadata of the failure flag, such as its tier designation as tier I, tier II, tier III, etc.) so that a suitable response can be determined (e.g., a failure action as selected in Block S230). Block S220 is preferably performed by an aggregator node substantially as described above, but can additionally or alternatively be performed by a behavior planning node as described above, a task node as described above, and/or any other suitable system or system component.

In a variation, Block S220 includes determining that the failure tier is the first tier (e.g., a tier I failure) based on receiving at least one of the failure flags from a task node publishing output to an actuator.

In another variation, Block S220 includes determining that the failure tier is the second tier (e.g., a tier II failure) based on receiving a failure flag from a task node of the set of task nodes for a time period exceeding a threshold duration. The threshold duration can, in examples, be proportional to the number of task nodes subscribing to the output of the task node raising the flag, inversely or directly proportional to the speed at which the vehicle is traveling and/or any other suitable dynamical property of the vehicle, and/or otherwise suitably based.

In variations wherein Block S210 includes generating a list of nonfunctional task nodes, Block S220 can include determining the failure tier based on the list of nonfunctional task nodes. For example, Block S220 can include determining the failure tier is the first tier (e.g., a tier I failure) by determining that the list of nonfunctional task nodes includes at least one task node that publishes output to the actuator of the actuation subsystem (e.g., controls an actuator).

In another example, Block S220 can include determining the failure tier based on comparing a list of nonfunctional task nodes to a prioritized list of degradation behaviors, wherein each degradation behavior requires a subset of task nodes of the set of task nodes for execution. For example, the prioritized list of degradation behaviors can include first, pulling over to the shoulder; second, slowing down to less than a threshold speed and transferring control of the vehicle to a teleoperator; and, third, performing a controlled stop in the lane in which the vehicle is traveling. In this example, Block S220 can include determining the failure tier is the first tier based on the subset of task nodes of each of the degradation behaviors of the prioritized list of degradation behaviors sharing at least one task node with the list of nonfunctional task nodes (e.g., none of the prioritized list of degradation behaviors can be safely executed to bring the vehicle to a controlled stop or otherwise under the control of a human operator). However, in alternative variations and/or examples, the prioritized list of degradation behaviors can include any other suitable tasks, and/or any number of suitable tasks (e.g., more than three, fewer than three, etc.).

In another variation, Block S220 includes determining that the failure tier is the second tier (e.g., a tier II failure) based on the number of failure flags received within a predetermined time window from a single task node. In another variation, Block S220 includes determining that the failure tier is the second tier (e.g., a tier II failure) based on the number of failure flags received from a unique set of task nodes (e.g., the number of failed task nodes). In another variation, Block S220 includes determining that the failure tier is the second tier (e.g., a tier II failure) based on the number of task nodes subscribing to the output of the failing task node (e.g., which generated the failure flag) exceeding a threshold number. However, Block S220 can additionally or alternatively include otherwise suitably determining the failure tier.

Block S230 includes selecting a failure action (e.g., response action, failure response action, etc.) based on the failure tier. Block S230 functions to determine a suitable response to a system or component failure based on the type and/or severity of the failure (e.g., as defined by the failure tier). The failure action can include an irreversible action, a controlled action, and/or a logging action, substantially as described above in relation to tier I failure responses, tier II failure responses, and tier III failure responses, respectively. However, selecting the failure action can additionally or alternatively include selecting any other suitable action in response to a failure of any suitable type. Block S230 is preferably performed by a behavior planning node substantially as described above, but can additionally or alternatively be performed by any suitable system or system component.

Block S240 includes executing the failure action (e.g., response action failure response action, etc.). Block S240 functions to implement the selected action (e.g., selected in accordance with Block S230). Block S240 is preferably implemented by a behavior planning node in conjunction with an actuation subsystem, substantially as described above. However, Block S240 can additionally or alternatively be performed by any suitable system or system component. In some variations, Block S240 can include recording and/or reporting system and/or component failure (e.g., at an onboard database, to a remote operator, etc.).

In variations, Block S240 includes executing the response action associated with the first tier and the second tier, which includes navigating the vehicle along a roadway. In related variations, Block S240 includes executing the response action associated with the third tier, which includes recording the failure flag and the corresponding task node generating the failure flag.

In further variations, Block S240 includes executing the irreversible response action, which includes controlling the vehicle to stop in the roadway in direct response to determining the failure tier is the first tier, and wherein executing the reversible response action comprises controlling the vehicle to traverse the roadway and stop proximal a side region adjacent to the roadway in direct response to determining the failure tier is the second tier.

However, in additional or alternative variations, Block S240 can include executing any other suitable action in response to a detected failure of any suitable tier or severity.

In a specific example, the method for managing component failure in a vehicle control system of a vehicle includes: at each of a set of task nodes of the vehicle control system: subscribing to input from at least one of a first task node of the set of task nodes and a sensor of a perception subsystem of the vehicle, transforming the input into an output according to a set of predetermined rules associated with the task node, publishing the output to at least one of a second task node of the set of task nodes and an actuator of an actuation subsystem of the vehicle, and comparing at least one of the subscription input and the published output to a failure criterion to generate a failure flag; at an aggregator node directly communicatively coupled to each of the set of task nodes: receiving a set of failure flags from the set of task nodes; determining a failure tier based on the set of failure flags, wherein the failure tier is one of a first tier, a second tier, and a third tier; determining a response action based on the failure tier, wherein the first tier corresponds to an irreversible response action, the second tier corresponds to a reversible response action, and the third tier corresponds to a logging action; and executing the response action corresponding to the failure tier.

The method 200 can additionally or alternatively include any other suitable Blocks, such as blocks implementing any functionality of a system substantially identical to the control system 100 described above in Section 3.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components, and the various method blocks.

As a person skilled in the art will recognize from the previous detailed description and from the figures and claims, modifications and changes can be made to the preferred embodiments of the invention without departing from the scope of this invention defined in the following claims.

What is claimed is:

1. A vehicle control system for controlling a vehicle, comprising:
   a set of task nodes, wherein each of the set of task nodes:
   is communicatively coupled to and receives subscription input from at least one of a task node of the set of task nodes and a sensor of a perception subsystem of the vehicle;
   compares a failure criterion to the subscription input to generate a failure flag and transforms the subscription input into published output, and
   provides the published output to at least one of another task node of the set of task nodes and an actuator of an actuation subsystem of the vehicle;
   an aggregator node directly communicatively coupled to each of the set of task nodes, and wherein the aggregator node:
   receives a set of failure flags from the set of task nodes,
   determines a failure tier based on the set of failure flags, wherein the failure tier is one of a first tier, a second tier, and a third tier, wherein the first tier is associated with an irreversible response action comprising a vehicle braking action, the second tier is associated with a reversible response action, and the third tier is associated with a logging action, and
   generates a failure tier message defining the failure tier;
   a behavior planning node communicatively coupled to the aggregator node, wherein the behavior planning node:
   receives the failure tier message, and
   in response to the failure tier defined by the failure tier message, generates vehicle control instructions corresponding to one of the logging action, the reversible response action, and the irreversible response action.

2. The system of claim 1, wherein the aggregator node determines the failure tier based on a number of failure flags of the set of failure flags received within a predetermined time window.

3. The system of claim 1, wherein the aggregator node generates a list of nonfunctional task nodes from the set of task nodes based on the set of failure flags, and determines the failure tier based on the list of nonfunctional task nodes.

4. The system of claim 3, wherein the list of nonfunctional task nodes associated with the first tier comprises at least one task node wherein the published output of the at least one task node controls the actuator of the actuation subsystem.

5. The system of claim 1, wherein the aggregator node determines the failure tier in response to a task node of the set of task nodes generating a failure flag for a time period exceeding a threshold duration.

6. The system of claim 5, wherein the threshold duration is inversely proportional to a number of task nodes that receive the published output of the task node.

7. The system of claim 1, wherein the actuation subsystem is controlled by the behavior planning node in combination with the set of task nodes, and wherein the actuation subsystem actuates control inputs of the vehicle to navigate the vehicle along a roadway in response to the vehicle control instructions.

8. The system of claim 7, wherein the vehicle control instructions corresponding to the reversible response action actuate a steering actuator of the actuation subsystem and a brake actuator of the actuation subsystem to bring the vehicle to a stopped condition at a righthand side of the roadway.

9. The system of claim 8, wherein the vehicle control instructions corresponding to the irreversible response action actuate the brake actuator to bring the vehicle to the stopped condition at a current instantaneous lateral position of the vehicle in the roadway, and wherein the irreversible response action is executed immediately upon receipt of the failure message defining the failure tier corresponding to the irreversible response action.

10. A method for managing component failure in a vehicle control system of a vehicle, comprising:
- at each of a set of task nodes of the vehicle control system:
  - subscribing to input from at least one of a first task node of the set of task nodes and a sensor of a perception subsystem of the vehicle,
  - transforming the input into an output according to a set of predetermined rules associated with the task node,
  - publishing the output to at least one of a second task node of the set of task nodes and an actuator of an actuation subsystem of the vehicle, and
  - comparing at least one of the subscription input and the published output to a failure criterion to generate a failure flag;
- at an aggregator node directly communicatively coupled to each of the set of task nodes:
  - receiving a set of failure flags from the set of task nodes;
  - determining a failure tier based on the set of failure flags, wherein the failure tier is one of a first tier, a second tier, and a third tier;
- determining a response action based on the failure tier, wherein the first tier corresponds to an irreversible response action, the second tier corresponds to a reversible response action, and the third tier corresponds to a logging action, wherein the irreversible response action actuates an actuator of the actuation subsystem of the vehicle, and wherein the irreversible response cannot be aborted until completion once initiated; and
- executing the response action corresponding to the failure tier.

11. The method of claim 10, wherein determining the failure tier based on the set of failure flags comprises determining that the failure tier is the first tier based on receiving at least one of the failure flags from a task node publishing output to the actuator.

12. The method of claim 10, wherein determining the failure tier based on the set of failure flags comprises determining that the failure tier is the second tier based on receiving a failure flag from a task node of the set of task nodes for a time period exceeding a threshold duration.

13. The method of claim 12, wherein the threshold duration is proportional to a speed of the vehicle.

14. The method of claim 10, further comprising generating a list of nonfunctional task nodes based on the set of failure flags, and determining the failure tier based on the list of nonfunctional task nodes.

15. The method of claim 14, wherein determining the failure tier is the first tier comprises determining that the list of nonfunctional task nodes comprises at least one task node that publishes the output to the actuator of the actuation subsystem.

16. The method of claim 14, further comprising determining the failure tier based on comparing the list of nonfunctional task nodes to a prioritized list of degradation behaviors, wherein each degradation behavior requires a subset of task nodes of the set of task nodes for execution.

17. The method of claim 16, further comprising determining the failure tier is the first tier based on the subset of task nodes of each of the degradation behaviors of the prioritized list of degradation behaviors sharing at least one task node with the list of nonfunctional task nodes.

18. The method of claim 10, wherein determining the failure tier based on the set of failure flags comprises determining that the failure tier is the second tier based on a number of failure flags of the set of failure flags received within a predetermined time window.

19. The method of claim 10, wherein executing the response action associated with the first tier and the second tier comprises navigating the vehicle along a roadway, and wherein executing the response action associated with the third tier comprises recording the failure flag and the corresponding task node generating the failure flag.

20. The method of claim 19, wherein executing the irreversible response action comprises controlling the vehicle to stop in the roadway in direct response to determining the failure tier is the first tier, and wherein executing the reversible response action comprises controlling the vehicle to traverse the roadway and stop proximal a side region adjacent to the roadway in direct response to determining the failure tier is the second tier.

* * * * *